United States Patent [19]
Bumpers

[11] Patent Number: 5,623,958
[45] Date of Patent: Apr. 29, 1997

[54] LOW PRESSURE RELIEF VALVE

[76] Inventor: Norman R. Bumpers, 2911 Country Club Dr., Pearland, Tex. 77581

[21] Appl. No.: 394,644

[22] Filed: Feb. 22, 1995

[51] Int. Cl.$^6$ .............................. F16K 17/26; F16K 15/04
[52] U.S. Cl. ................. 137/269; 137/493.9; 137/533; 137/533.11; 137/549
[58] Field of Search ................... 137/493.9, 545, 137/549, 533.11, 269, 533

[56] References Cited

U.S. PATENT DOCUMENTS

| | | | |
|---|---|---|---|
| 957,318 | 5/1910 | Ellis | 137/493.9 |
| 1,856,492 | 5/1932 | Marshall | 137/493.9 X |
| 3,813,896 | 6/1974 | Lebahn | 137/493.9 |
| 3,814,123 | 6/1974 | Cook | 137/493.9 |
| 4,016,904 | 4/1977 | Gordon | 137/493.9 |
| 5,137,049 | 8/1992 | Orlowski | 137/533.11 |
| 5,259,412 | 11/1993 | Scott | 137/588 |

FOREIGN PATENT DOCUMENTS

| | | | |
|---|---|---|---|
| 99096 | 4/1961 | Netherlands | 137/493.9 |
| 7501146 | 1/1975 | Netherlands | 137/493.9 |

*Primary Examiner*—John Rivell
*Attorney, Agent, or Firm*—Bill B. Berryhill

[57] ABSTRACT

A low pressure relief valve having a flow passage therethrough providing fluid communication between the interior and exterior of a vessel the interior of which is under a low positive or negative pressure. A valve port in the flow passage has a valve seat therearound and a closure member is carried in said valve body for engagement with the valve seat to block fluid communication between the interior and exterior of said vessel. The closure member is of a preselected weight and is free to disengage the valve seat in response to a predetermined increased pressure differential between the vessel interior and exterior, without being affected by any other force than gravity, to permit fluid communication through the flow passage for reducing the pressure differential.

15 Claims, 8 Drawing Sheets

LOW PRESSURE RELIEF VALVE

BACKGROUND OF THE INVENTION

1. Field of the Invention

The present invention pertains to valves. More specifically, the present invention pertains to low pressure relief valves. In particular, the present invention pertains to low pressure relief valves suitable for maintaining containment vessels or systems at very low positive pressures or negative pressures (vacuum)

2. Description of the Prior Art

Many containment vessels or systems are designed for low pressure (positive or negative). If the design pressure or vacuum (negative pressure) is exceeded, even momentarily, the vessel may fail resulting in much physical damage and harm to equipment, personnel and the environment. To remedy this situation such containment vessels or systems are commonly provided with some type of relief valve which helps maintain the vessel or system within its design parameters. For example, if a vessel is to be maintained at or below a specified pressure, the valve will open in response to greater pressures to allow fluid flow from the vessel until the pressure is reduced to an acceptable level. If the vessel operates under a vacuum (negative pressure) the relief valve may be designed to open when the negative pressure becomes too great, allowing fluid flow from the exterior of the vessel into the vessel until the negative pressure is reduced to an acceptable level.

Most pressure relief valves are provided with a closure member which is biased against the seat of a valve port to close the valve. The spring is designed so that upon increase of pressure above a specified amount, the closure member will be lifted off of its seat to allow fluid flow through the valve port. Examples of such spring-influenced valve closure members are disclosed in U.S. Pat. Nos. 4,632,146; 4,662,616; 4,765,504; 4,951,701 and 5,213,586. An example of a spring-loaded vacuum (negative pressure) relief valve may be seen in U.S. Pat. No. 4,133,346.

Relief valves for very low positive pressure or vacuum containment vessels need to be very sensitive since a relatively small increase in pressure (positive or negative) may result in failure of the vessel. Spring loaded relief valves are more suitable for higher pressure operation and are frequently not as sensitive as required for low pressure operation. Furthermore, springs, hinged plates or other mechanisms used in biasing closure members against a valve seat are subject to failure or malfunctioning from corrosion and exposure to the contents of the vessel with which it is used or the atmosphere surrounding the vessel.

There are other relief valves or vents in which a closure member, such as a ball, operates without the influence of a spring. Examples of such may be seen in U.S. Pat. Nos. 2,935,990; 3,733,449 and 4,518,363. However, these valves, typically referred to a ball float valves, require rising water or other liquids for movement of a ball away from or toward the seat of a valve port. Such a valve would not be suitable for a containment vessel or apparatus which is filled with a gaseous fluid or a liquid above which a vapor space exists.

SUMMARY OF THE INVENTION

The present invention provides a low pressure relief valve sensitive to low positive or negative pressures therein for relieving excessive positive or negative pressures, as required, and without being influenced by any force other than gravity and pressure within the vessel. The relief valve of the present invention may include a valve body having a flow passage therethrough to provide fluid communication between the interior and exterior of a vessel, the interior of which is under a low positive or negative pressure. The valve is provided with a valve port having a valve seat therearound and a closure member which is engageable with the valve seat to block fluid communication between the interior and exterior of the vessel. The closure member is of a preselected weight and is free to disengage the valve seat in response to a predetermined increased pressure differential between the interior and exterior of the vessel without being affected by any other force than gravity to permit fluid communication through the flow passage for reducing the pressure differential.

In preferred embodiments, the closure member is spherically or ball shaped and is contained in a tubular guide which is open at one end to receive and guide the closure member as it disengages the valve seat but is closed at another end to limit movement of the closure member away from the valve seat. In some embodiments of the invention, the valve is provided with filter means through which any fluid passing between the exterior and interior of the vessel must pass for filtering, coalescing or adsorbing selected components thereof. In other embodiments, the intake and/or discharge sides of the valve port or ports are connected to remotely extending conduits so that fluid communication through the valve port is not influenced by the environment immediately adjacent to the vessel.

In another preferred embodiment of the invention, the pressure relief valve may be provided with two ports and two corresponding closure members. One of the closure members may be of a weight responsive to an increased negative pressure within the vessel to disengage the valve seat and the other may be designed to be responsive to an increased positive pressure within the vessel to disengage the valve seat. This allows fluid to flow into the interior of the vessel to decrease negative pressure or out of the interior of the vessel to decrease positive pressure, therefore maintaining the vessel at pressures between a preselected negative pressure and a preselected positive pressure. Alternate embodiments of the valve provide additional valve ports and closure members of differing weights which permit additional flow between the interior and exterior of the vessel in cooperation with the first mentioned valve port and closure member for further decrease of negative or positive pressures as the case may be.

The pressure relief valve of the present invention is unique. It's closure members are very sensitive to changes in low pressure and are responsive only to pressures within the vessel and gravity for operation thereof. No springs or other mechanisms are required, eliminating the potential malfunctions thereof. Neither does the relief valve of the present invention require buoyancy provided by a rising liquid.

The relief valve of the present invention is of a design which may be easily adapted for use with vessels operating under low positive pressures or under a vacuum (low negative pressure). Furthermore, it is easily adapted for a vessel which operates at various times under both a low positive and a low negative pressure to maintain the vessel at pressures between a preselected negative pressure and a preselected positive pressure.

The low pressure relief valve of the present invention may also be easily provided with spark arresters, filters, adsorbing elements, etc. to prevent entry of harmful materials into the vessel or to prevent environmentally contaminating components from exiting the vessel. It may also be easily adapted with remotely extending conduits so that fluid communication through the valve ports into or out of the vessel is not influenced by the environment immediately adjacent to the vessel. The valve of the present invention is unique in its simplicity of construction and operation. It may be easily adapted to a variety of applications for both low positive and negative pressure containment. Many other objects and advantages of the invention will be apparent from reading the description which follows in conjunction with the accompanying drawings.

DESCRIPTION OF PREFERRED EMBODIMENTS OF THE INVENTION

Figure 1:
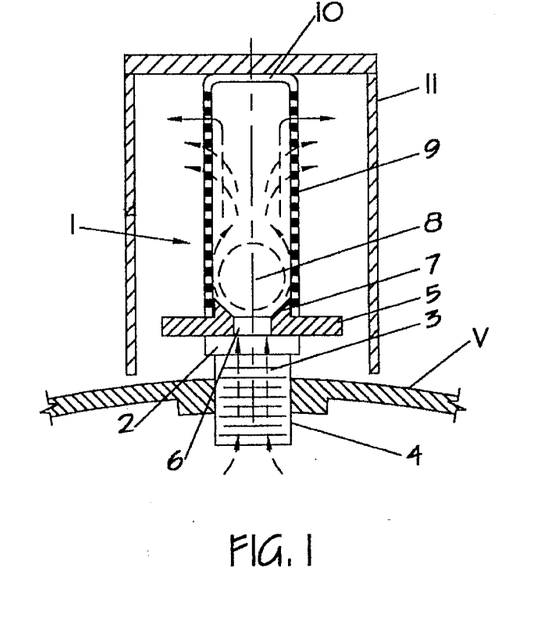
FIG. 1 is an elevation view, partially in section, of a low pressure relief valve according to a preferred embodiment of the invention.

Referring first to FIG. 1 there is shown a low pressure relief valve 1 specifically designed, according to a preferred embodiment of the invention, for use with a low pressure containment vessel V or system. The valve has a valve body or housing 2 having a flow passage 3 therethrough which provides fluid communication between the interior and exterior of the vessel V which is to be maintained at a low pressure. The valve may be provided with a threaded base 4 or a flange 5 for connection to a hole or conduit in communication with the interior of the vessel V. The valve 1 is also provided with a valve port 6 having a tapered valve seat 7 therearound. A closure member, ball 8 in the exemplary embodiment, is carried in the valve body 2 for engagement with the valve seat 7 to block fluid communication between the interior and exterior of the vessel V. Surrounding the valve port and seat 6, 7 and extending upwardly therefrom is a tubular guide member 9 which is open at the lower end to receive and guide the closure member 8 as it is lifted away from the seat 7. The tubular member 9 is closed by an upper end wall 10 to limit upward movement of the ball closure member 8. The walls of the tubular member 9 are perforated to allow air, gas or vapors exiting from the vessel with which the valve is to be used to exit the perforations as illustrated by the arrows in FIG. 1. In fact, the member 9 could also be a wire cage or the like.

The ball closure member 8, normally seated on the valve seat 7 is selected of a specific weight so that if the pressure differential between the interior of the vessel in which the valve is to be used and the exterior thereof reaches a predetermined amount, the ball 8 will be lifted off of the seat 7 rising within the tubular guide 9 to allow venting of air, gas or vapor from the vessel. When this differential pressure is sufficiently reduced, the ball 8 will be reseated, by gravity, to again seal the valve port 6 and maintain the vessel beneath the specified pressure differential. Thus, the ball closure member 8 is free to disengage the valve seat 7 in response to a predetermined increased pressure differential between the vessels interior and exterior without being affected by any other force than gravity, permitting fluid communication through the valve flow passage for reducing the pressure differential. If desired, a weather hood 11 may be provided to shield the valve 1 from the surrounding elements.

Figure 2:
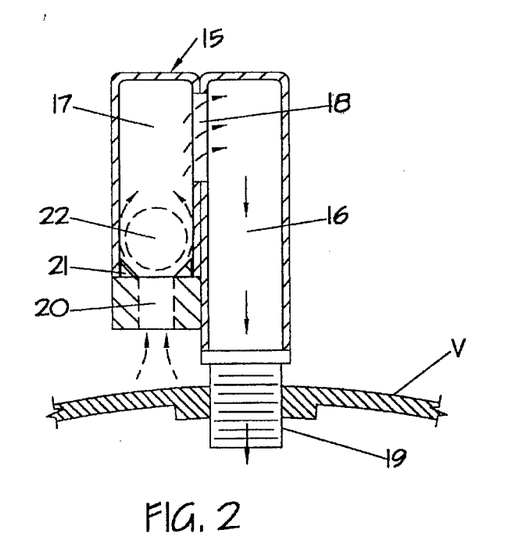
FIG. 2 is an elevation view, partially in section, of a low negative pressure relief valve according to a preferred embodiment of the invention.

FIG. 2 illustrates a low pressure relief valve, similar to the one of FIG. 1, but designed primarily for a vessel V which is to be maintained under a vacuum (negative pressure). The relief valve 15 of FIG. 2 has side-by-side chambers 16 and 17 which communicate with each other through an elongated slot 18. The lower end of chamber 16 may be provided with a threaded portion 19 or any other suitable means for connecting the valve 15 to an aperture of the vessel V. The lower end of the chamber 17 is provided with a valve port 20 having a valve seat 21 therearound. The valve port 20 communicates with the air or other atmosphere surrounding the vessel V. The valve 15 is also provided with a closure member, illustrated as a ball member 22, which under normal operating pressures would, by gravity, rest against the valve seat 21 sealing the chambers 17 and 16 and the vessel V from the atmosphere surrounding the vessel V.

Like in the previously described embodiment of FIG. 1, the closure member 22 is of a preselected weight and is free to disengage the valve seat 21 in response to a predetermined increased pressure differential between the interior of the vessel V and the exterior thereof without being affected by any other force than gravity. When so disengaged and lifted away from the valve seat 21, as illustrated in FIG. 2, atmospheric air will enter the port 20, travel around the closure member 22 and through chambers 17 and 16 until the fluid communication through the valve flow passage into the vessel V reduces the pressure differential between the interior and exterior of the vessel V below said predetermined pressure differential. When the negative pressure (vacuum) is sufficiently relieved and reduced, the closure member 22 will, by gravity, reseat against the seat 21 preventing further fluid communication between the exterior and interior of the vessel V until again required.

Figure 3:
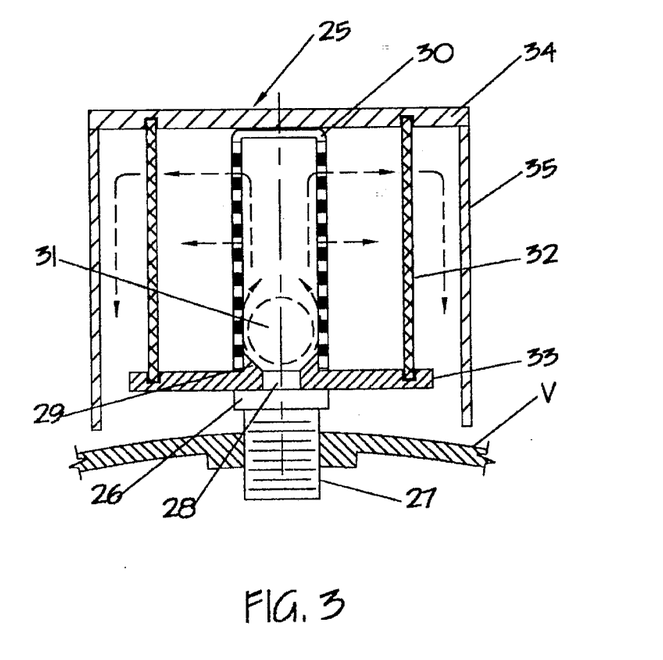
FIG. 3 is a low pressure relief valve similar to FIG. 1 but equipped with filtering elements, according to an alternate embodiment of the invention.

The relief valve 25 of FIG. 3 is similar to the relief valve of FIG. 1 and is shown maintaining a low positive pressure in a vessel V. The valve has a valve body 26 at the lower end of which is a threaded extension 27 for connection in an aperture of the vessel V. The valve 25 has a flow passage which includes a valve port 28 around which is a valve seat 29. A wall perforated tubular guide 30 similar to the tubular guide 9 of FIG. 1 extends upwardly from the port 28. A closure member 31 of a predetermined weight is engageable with the valve seat 29 when the internal pressures of the vessel V do not exceed a preselected amount. Surrounding the tubular guide 30 is a filter element 32. The element 32 can be designed as a screen to repel entry of bugs or other agents externally of the system. It can also be designed as a spark arrestor element to comply with NFPA, API, and OSHA standards. The filter element 32 can be designed as a filter/separator element to prevent solid or vapor contaminants from escaping to the atmosphere or designed as an adsorber element for emission control of vapor or odor. Mounting plates 33 and 34 may be provided for mounting the filter element 32 and a weather hood 35 may be provided for protecting the valve components from the elements.

If the pressure differential between the interior and exterior of the vessel V exceeds a predetermined value, the closure member 31 disengages the valve seat 29 and moves away from the valve seat 29 guided by the surrounding tubular guide 30. As this occurs, air, gas or vapors within the vessel V exit through the valve port 28 around the closure member 31 and through the perforations of the perforated guide 30, through the filter element 32 and the weather hood 35 eventually exiting to the atmosphere surrounding the vessel V.

Figure 4:
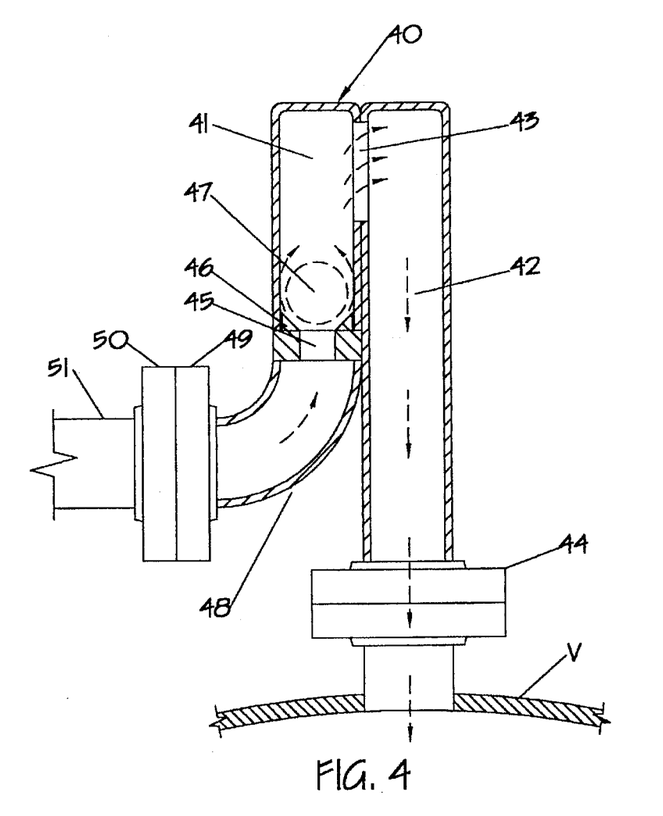
FIG. 4 is an elevation view, partially in section, of a low negative pressure relief valve according to an alternate embodiment of the invention.

FIG. 4 illustrates a low pressure relief valve, similar to the one shown in FIG. 2, for relieving excessive vacuum (negative pressure) in a vessel V. This valve 40 is provided with side-by-side chambers 41, 42 which communicate through an elongated slot 43 to provide a flow passage for fluid communication between the interior of the vessel V and the exterior thereof. The valve 40 is provided with a valve port 45 around which is a valve seat 46 engageable by a ball closure member 47 of a preselected weight. The valve port 45 is in fluid communication with an elbow 48 connected by flange members 49 and 50 to a pipe or conduit 51 which remotely extends to a source of unpolluted or controlled air or other gas, so that any such air or gas which flows into the vessel V will not be influenced by the environment immediately adjacent to the vessel V.

As indicated, the ball closure member 47 is of a preselected weight so that if the vacuum (negative pressure) of vessel V exceeds a certain value, the ball will be lifted off of the valve seat 46 allowing air or other gas to flow through the conduit 51, elbow 48, around ball closure member 47 and through chambers 41 and 42 into the vessel V until the vacuum or negative pressure is sufficiently reduced. When this occurs, the closure member 47 falls, by gravity, against the valve seat 46 again blocking the valve port 45 and preventing further fluid communication between the interior and exterior of the vessel V.

Figure 5:
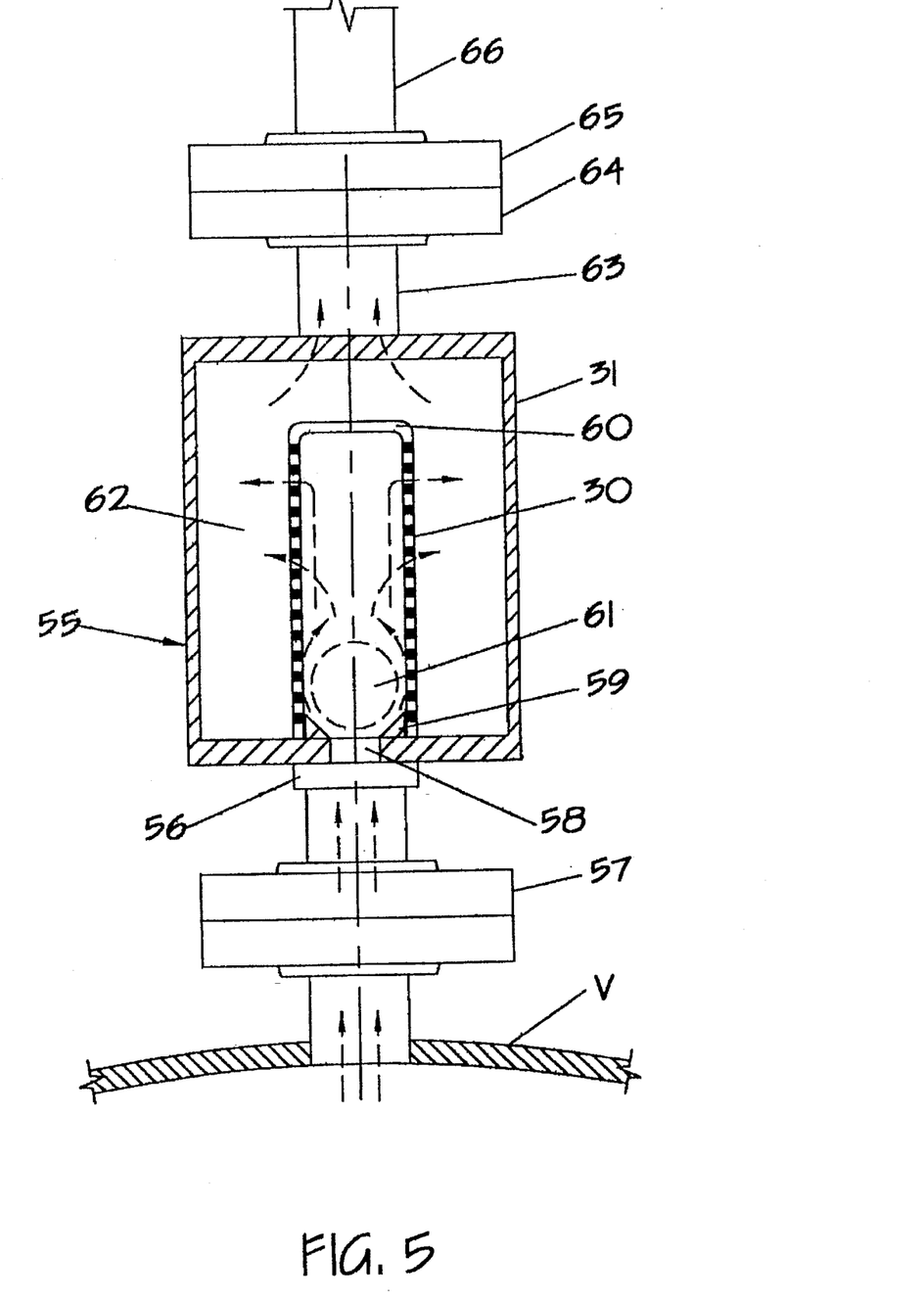
FIG. 5 is an elevation view, partially in section, of a low positive pressure relief valve according to another alternate embodiment of the invention.

FIG. 5 illustrates a low pressure relief valve 55, according to another embodiment of the invention, primarily for use with a vessel V under a low positive pressure. The valve body 56 of valve 55 is connected at its lower end by a flange 57 or the like to an aperture in the vessel V. The valve has a valve port 58 around which is provided valve seat 59 and upwardly from which extends perforated tubular guide 60 for guiding the ball closure member 61. Totally surrounding the perforated ball guide 60 is a chamber or plenum 62 which isolates the upper portion of the valve 55 from the surrounding atmosphere. The chamber or plenum 62 is in fluid communication, through a short nipple 63 and flanges 64, 65, with a conduit 66 which extends to a remote location for discharge or further treatment of exiting fluids away from the atmosphere surrounding the vessel V.

Thus, if the pressure within the vessel V exceeds a predetermined amount, the closure member 61 of preselected weight disengages valve seat 59 opening the valve port 58 and allowing gases, vapors, etc. from the vessel V to flow through the port 58 around the closure member 61 and through the perforations of the perforated guide 60 into the surrounding chamber or plenum 62. The gasses or vapors then exit the plenum 62 through nipple 63 and the conduit 66 to a remote point for discharge or further treatment. When the pressure within the vessel V is sufficiently reduced, the closure member 61, under the force of gravity, reengages the seat 59 sealing the valve port 58 and blocking further fluid communication between the interior and the exterior of the vessel V.

Figure 6:
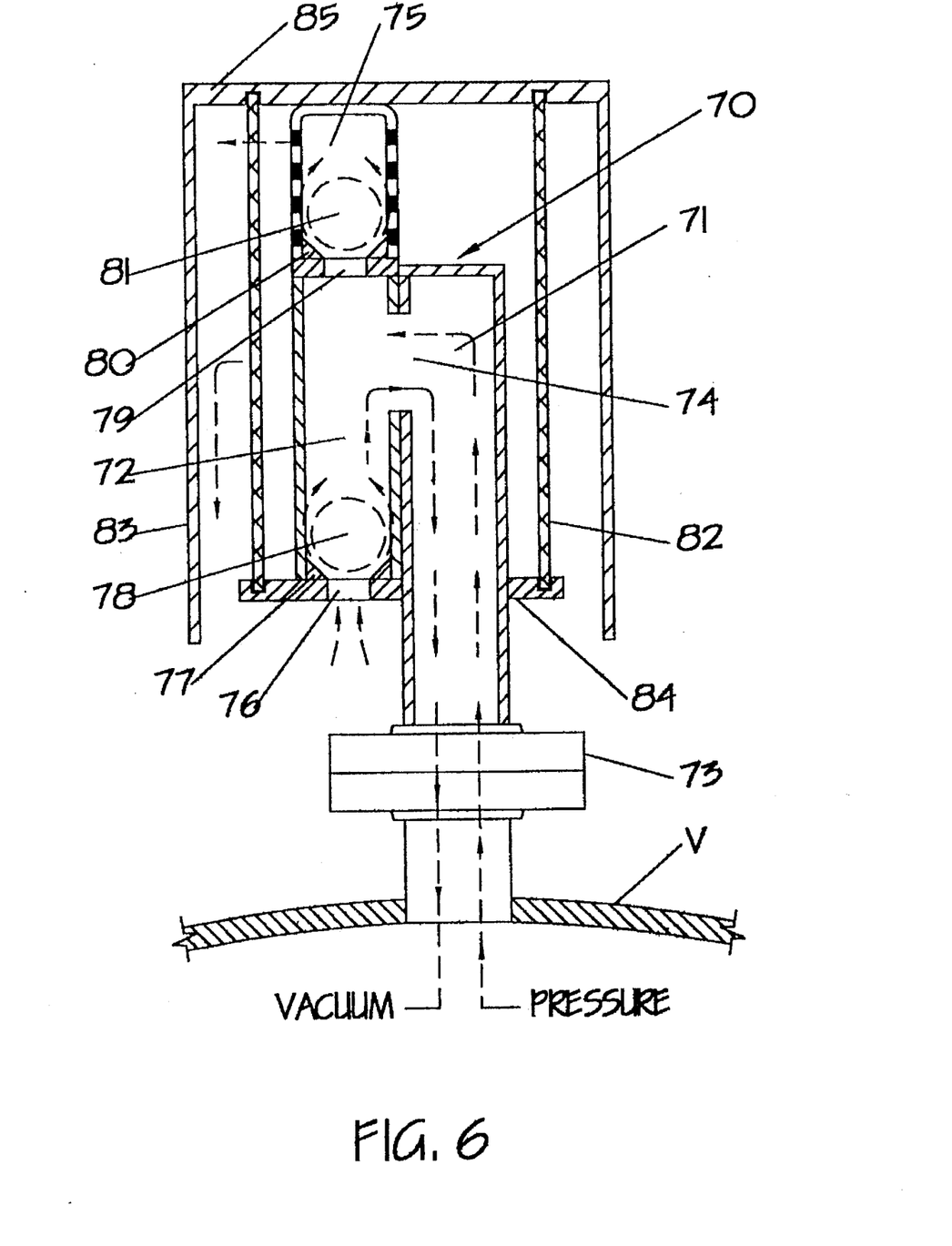
FIG. 6 is an elevation view, partially in section, of a low pressure relief valve which may function for both low positive pressure and low negative pressure relief, according to still another embodiment of the invention.

Some low pressure vessels operate in a range of pressures between a low positive pressure and a vacuum or negative pressure. FIG. 6 illustrates a relief valve 70 suitable for such service. The valve body of the valve 70 includes two side-by-side chambers 71 and 72 at the lower end of one of which may be provided with a flange 73 for connecting the valve 72 to an inlet or discharge aperture of the vessel V. The chamber 71 and 72 communicate with each other through an elongated slot 74. Directly above the chamber 72 is another chamber or tubular member 75, the walls of which are perforated. Provided at the bottom of the chamber 72 is a valve port 76 surrounded by a valve seat 77. Contained and guided within the chamber 72 for limited upward and downward movement therein is a ball closure member 78 of preselected weight. The base of the chamber 75 is also provided with a valve port 79 surrounded by a valve seat 80. A ball closure member 81 of preselected mass is disposed within the chamber 75 and guided thereby for limited upward and downward movement therein. If desired a filter element 82 and weather hood 83 may surround the valve 70. Mounting plates 84 and 85 help hold these elements in place.

If the vessel V is operating under a vacuum or negative pressure, the upper closure member 81 will be drawn against its seat 80, blocking the valve port 79 and preventing fluid communication therethrough between the interior and exterior of the vessel V. However, if the vacuum or negative pressure within the vessel V exceeds a predetermined limit, the closure member 78 will be lifted off of its seat 77 unblocking the valve port 76 and allowing air to flow around the closure member 78, through the chamber 72 and 71 into the vessel V to reduce the magnitude of the vacuum or negative pressure therein. When the negative pressure or the vacuum is sufficiently reduced, the closure member 78 will, under the influence of gravity, reassume a position engaging valve seat 77 blocking further fluid communication between the interior and exterior of the vessel V.

On the other hand, if the vessel V is operating under a low positive pressure, the closure member 78 will be forced downwardly against the valve seat 77, blocking valve port 76 and preventing any fluid communication therethrough between the interior and exterior of the vessel V. However, if pressure within the vessel V exceeds a predetermined amount, the closure member 81 will be lifted away from its seat 80, unblocking valve port 79 and allowing gas, vapors, etc. to exit the vessel V through the perforations of the chamber 75 and through the filtering element 82 for eventual discharge to the surrounding environment or, if connected with a remotely extending conduit (not shown), to a remote source of discharge or further treatment.

Thus, the relief valve of FIG. 6 is a combination positive/ negative pressure relief valve for maintaining a vessel V between a preselected negative pressure and a preselected positive pressure. As with the previously described valves, the preselected pressures are determined by the preselected weights of the closure members 78 and 81.

Figure 7:
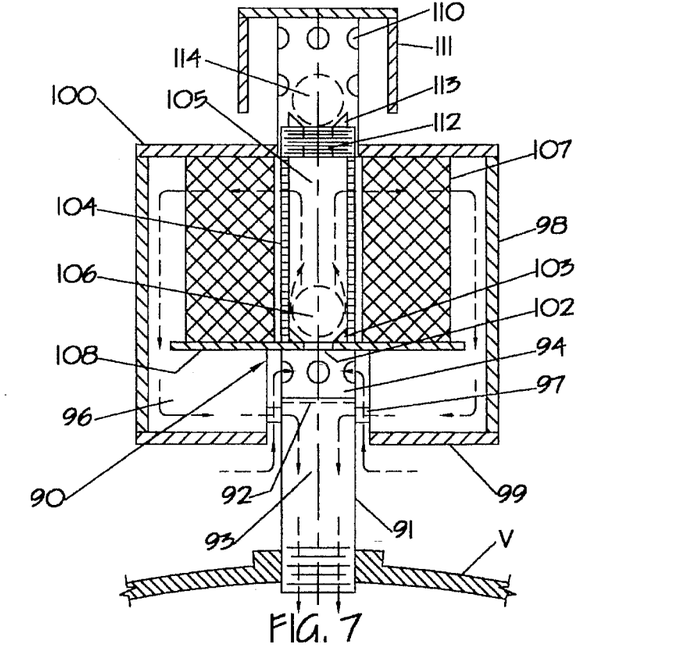
FIG. 7 is an elevation view, partially in section, of another low pressure relief valve, with a filter element, which functions to relieve both excessive positive pressure and excessive negative pressure, illustrating the valve operating under conditions of low negative pressure or vacuum.

FIG. 7 illustrates another valve 90 which, similar to valve 70 of FIG. 6, provides pressure relief for a vessel V operating under low positive pressures as well as low negative pressures or vacuums. The lower end of the body of valve 90 is provided with a tubular base 91 which may be threaded or flanged for connection to the vessel V. The base 91 is provided with an internal divider plate 92 which divides the base into a lower chamber 93 and an upper chamber 94. The upper chamber 94 is in fluid communication with the exterior of the vessel V through perforations in the walls thereof. The lower chamber 93 is in fluid communication with the vessel V and is also in communication with a surrounding plenum 96 through interconnecting tubes, passages or conduits 97. The plenum 96 is outwardly defined by outer walls 98 and upper and lower plates 99, 100.

Directly above the chamber 94 is a valve port 102 surrounding which is valve seat 103. Extending upwardly from the seat 103 is a perforated tubular member 104 defining a chamber 105 for guiding a ball closure member 106 which is engageable with a valve seat 103. A filter element 107 supported on plate 108 surrounds the perforated tubular member 104.

Directly above the tubular member 104, or as an extension thereof, is another perforated tubular member 110 around which may be provided a weather hood 111. The perforated tubular member 104 may communicate with a perforated tubular member 110 through a valve port 112 around which is provided a valve seat 113. Carried within the perforated tubular member 110 for engagement with valve seat 113 is a ball closure member 114 of a preselected weight.

The relief valve of FIG. 7 will be described in FIG. 7 as operating under a condition in which the vessel V is under a vacuum or negative pressure. Under this condition, both closure members 106 and 114 may under gravitational forces, be seated against their respective seats 103, 113, blocking fluid communication between the interior and exterior of the vessel V. However, if the vacuum or negative pressure within the vessel V exceeds a predetermined value the upper closure member 114 will remain seated against its valve seat 113 but the lower closure member 106 will, through the influence of increased vacuum or negative pressure, disengage its seat 103 allowing air to be drawn through the perforated chamber 94 and valve port 102, around closure member 106, through the filter element 107 into the surrounding plenum 96. From the plenum 96 the air is drawn through the tubes 97 into the lower valve body chamber 93 and eventually into the vessel V. This occurs until the vacuum or negative pressure is sufficiently reduced. Then the closure member 106, by the force of gravity, reassumes its position engaging valve seat 103 blocking valve port 102. Since both valve ports 102 and 112 are now blocked, fluid communication between the interior and exterior of the vessel V is blocked.

Figure 8:
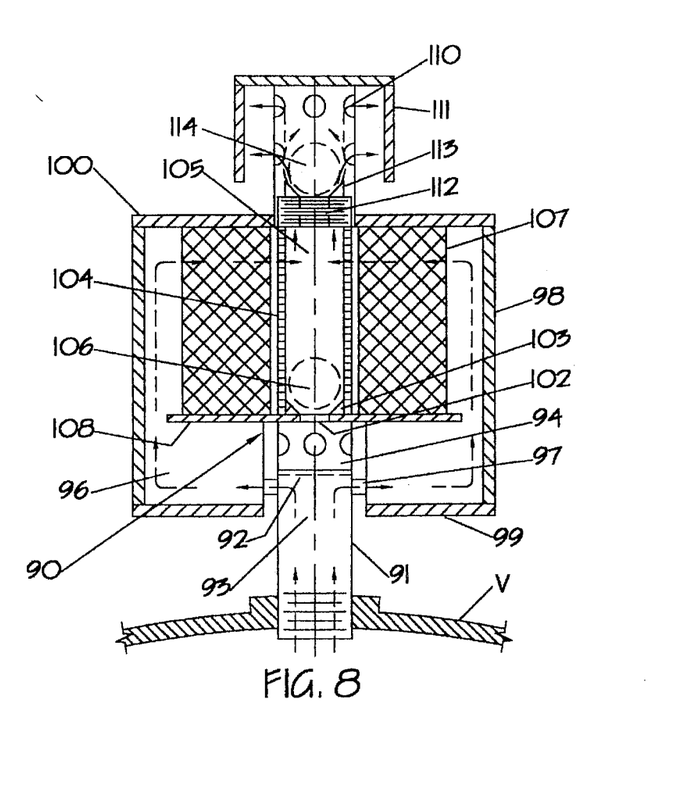
FIG. 8 is an elevation view, partially in section, of the valve of FIG. 7 illustrating the valve operating under low positive pressure operating conditions.

FIG. 8 shows the same valve as shown in FIG. 7. However, the operation of the valve 90 will be described with reference to FIG. 8 in an operating condition in which the vessel V is under a low positive pressure. With the vessel V under a low positive pressure, gasses or vapors therefrom are transmitted through the lower chamber 93 and tubes 97 into the surrounding chamber or plenum 96. From the plenum 96 the gasses or vapors may pass through the filter element 107 and the perforated walls of the tubular member 104 into the chamber 105. A positive pressure in the chamber 105 will keep the closure member 106 against its port 103 blocking any fluid communication to the port 102. However, if the pressure within the vessel V exceeds a predetermined amount, the upper valve closure member 114 will be lifted from its seat 113 allowing fluid communication through port 112, around closure member 114 and through the perforations of the tubular member 110 to the atmosphere. Once the pressure within the vessel V is sufficiently reduced, the closure member 114 will, by gravity, reassume a position engaging the seat 113 and blocking fluid communication through port 112. With both ports 112 and 102 blocked, further fluid communication between the interior and exterior of the vessel V is prevented. The valve of FIGS. 7 and 8 may operate with or without the filter element 107. If the filter element 107 is in place all fluid flowing into or out of the vessel V must pass therethrough.

Figure 9:
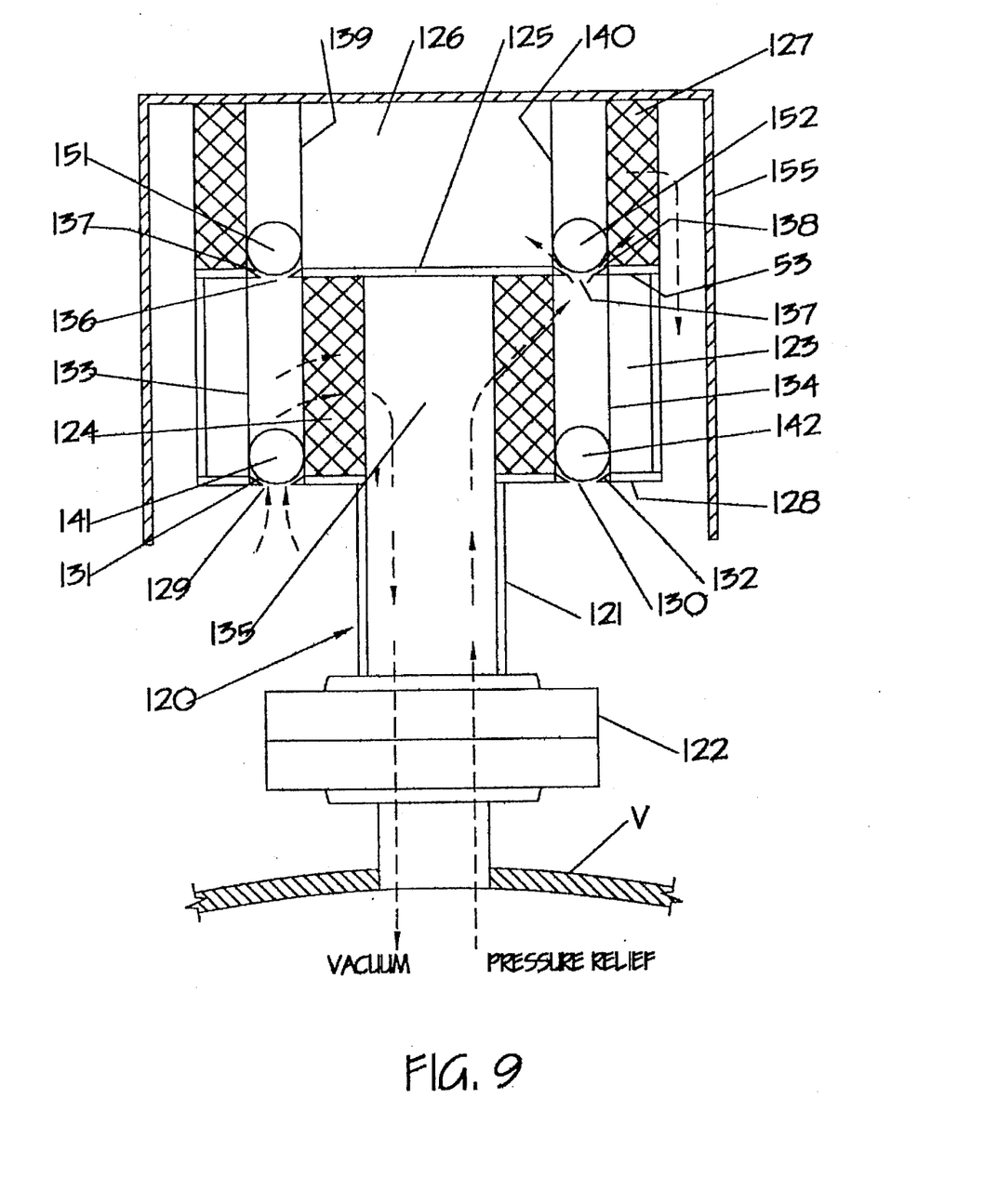
FIG. 9 is an elevation view, partially in section, of a low pressure relief valve, with filter elements, utilizing multiple valve ports and closure members and designed to relieve both excessive positive pressure and excessive negative pressure (vacuum), the left hand portion of the drawing illustrating vacuum operation and the right hand portion of the drawing illustrating positive pressure operation, the valve.

FIG. 9 illustrates another relief valve 120 according to still another preferred embodiment of the invention. The valve 120 may be utilized in combination pressure/vacuum functions in which the vessel V might operate under a low positive pressure or under a vacuum (negative pressure). The valve 120 provides a valve body 121 connected to the vessel V by flange or other connecting element 122. Surrounding the valve body 121 is an annular chamber 123 in which may be provided a filter element 124. Directly above the chamber 123, separated therefrom by pressure plate 125 is an upper chamber 126. The upper chamber 126 may be surrounded by an annular filter element 127.

The lower portion of the lower chamber 123 is defined by a vacuum plate member 128 in which is provided with a plurality of valve ports or orifices 129, 130 which are surrounded by corresponding valve seats 131, 132. Extending upwardly from the ports 129 and 130 are corresponding perforated tubular guides 133, 134. These tubular guides 133, 134 are perforated or slotted so that they communicate through filter element 124 with the flow passage 135 of the valve body 121. Provided in the pressure plate 125 are a plurality of valve ports 136, 137 around which are corresponding valve seats 137, 138. Extending upwardly from the valve ports 136, 137 are perforated tubular guides 139, 140 which may or may not be extensions of the lower tubular guides 133, 134.

Carried in the lower tubular guides 133, 134 for engagement with the valve seats 131 and 132 are ball closure members 141 and 142. These closure members 141 and 142 may be of different weights for purposes of which will hereafter be understood. Carried in the upper guides 139, 140 for engagement with valve seats 137, 138 are closure members 151, 152. The closure members 151, 152 may also be of different weights. Although two lower ports 129, 130 and corresponding closure members 141, 142 and two upper ports 136, 137 and corresponding upper closure members 151, 152 of different weights are shown in FIG. 9, it can be understood that any number of such ports and closure members may be utilized to provide combined valve port areas less than, equal to or greater than the cross sectional area of connections with the vessel V. It will also be understood hereafter that by utilizing closure members of various weight combinations, two or more positive relief pressures and two or more vacuum relief pressures may be obtained.

Referring now to the left hand side of FIG. 9, functioning of the valve 120 will be explained in which the vessel V is operating under a vacuum or negative pressure. As vacuum is applied through the flow passage 135 negative pressure communicates with the surrounding plenum 123 and the specified weight closure members 141, 142, 151, 152. Under this condition, the upper closure members 151, 152 will remain seated against their respective seats 137, 138 blocking fluid communication through ports 136, 137. Initially, the closure members 141 and 142 will also block flow through ports 129 and 130. It will be recalled that the closure members 141 and 142 are of different weights. Assuming that the closure member 141 is lighter than closure member 142, closure members 141 and 142 will respond to two different vacuums or negative pressure. One vacuum or negative pressure may be sufficient to lift closure member 141 off of its seat 131 allowing atmospheric air to flow into the perforated tube 133 through filter 124 and the flow passage 135 into the vessel V. This may be sufficient to reduce the vacuum or negative pressure in the vessel V. However, if the vessel is evacuated quickly and/or the port 129 is not sufficient to reduce the vacuum as required, the heavier closure member 142 would also be lifted off of its seat 132 adding the area of the valve port 130 to the area of valve port 129 and allowing additional air to flow into the vessel V to avoid danger thereto.

Referring now to the right hand side of FIG. 9, functioning of the valve 120 with a vessel under a low positive pressure will be described. In such condition, the positive pressure would be applied through flow passage 135 to the plenum or chamber 123 and through the perforated tubes 133, 134 to the closure members 141, 142, 151, 152. Again, it will be assumed that one of the upper closure members 151 is of lighter weight than the other closure member 152. With a positive pressure in the plenum 123, the lower closure members 141, 142 positively engage their corresponding seats 131, 132 preventing fluid communication through corresponding ports 129, 130. An increase in pressure above a predetermined level however will cause the lighter closure member 151 to be lifted from its seat 137 allowing the gasses or vapors in the vessel V to flow through port 136 and the perforated guide tube 139 into the chamber 126. The gasses may then flow through filter element 127 and out from under the weather hood 155 to the atmosphere. If the port 136 is not of sufficient area to adequately relieve the pressure and it builds to a higher preselected amount, the heavier closure member 152 will also be lifted from its seat 138 so that the areas of valve ports 136 and 137 are then combined to increase the flow from the vessel V so that the pressure therein is sufficiently reduced. As the pressure is sufficiently reduced, the closure members, first closure member 152 and then closure member 151, then reassume, by a force of gravity, positions engaging respective valve seats 137, 138 blocking fluid communication between ports 136 and 137. Since the ports 129 and 130 are already blocked, further fluid communication between the interior and exterior of vessel V is prevented.

Figure 10:
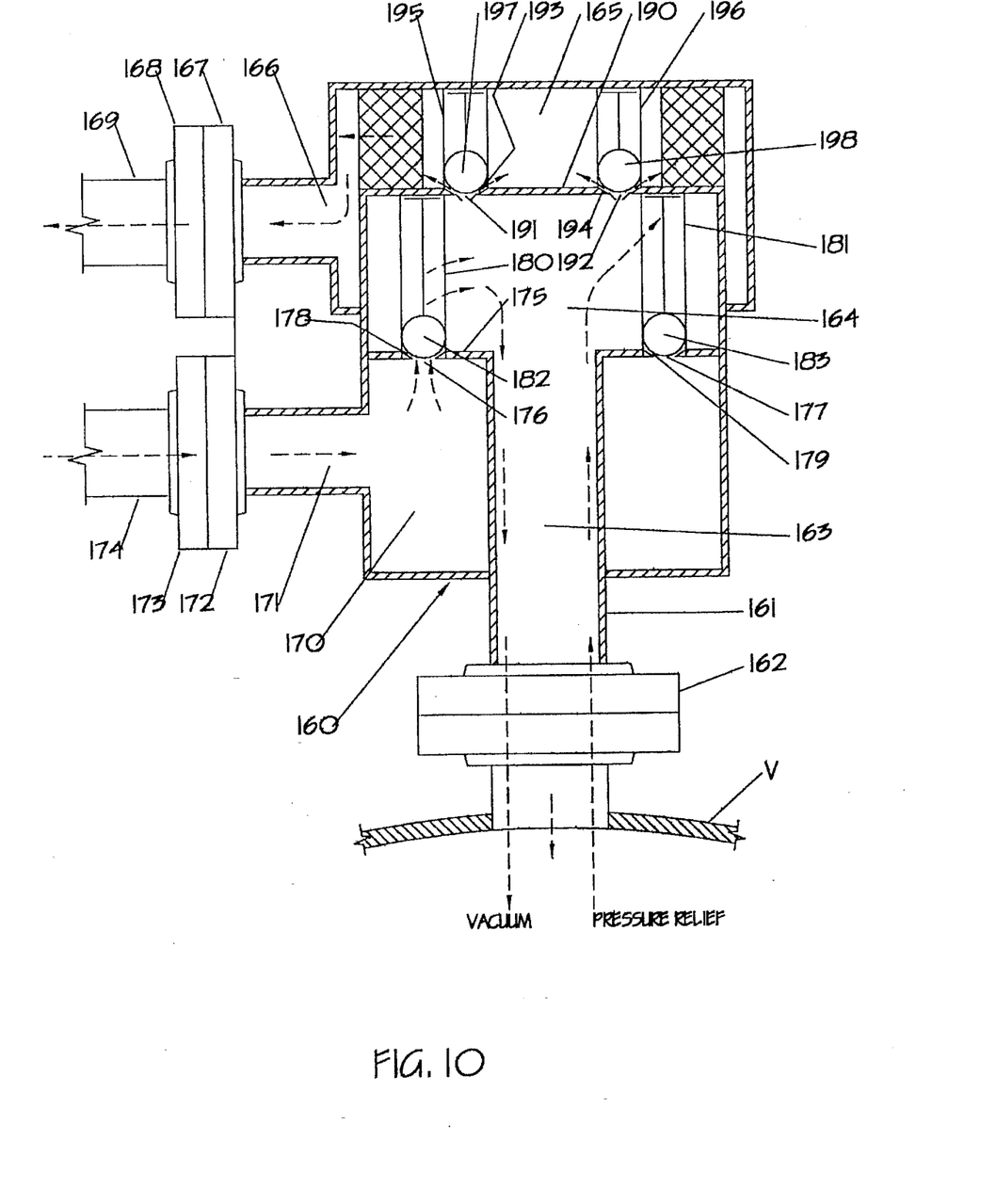
FIG. 10 is an elevation view, partially in section, of another low pressure relief valve, with filter elements, utilizing multiple valve ports and closure members, for maintaining a containment vessel between a preselected positive pressure and a preselected negative pressure, the left hand portion of the drawing representing the valve operating under conditions of negative pressure (vacuum) and the right hand portion of the drawing illustrating the valve operating under positive pressure, according to still another embodiment of the invention.

The valve 160 of FIG. 10 is a multiple port combination pressure/vacuum relief valve which functions in a manner similar to that of FIG. 9 but with an additional containment feature. Valve 160 is provided with a valve body 161 at the lower end of which is a flange 162 for connection to the vessel V. A flow passage 163 communicates with a lower plenum or chamber 164 above which is another plenum or chamber 165. The upper plenum or chamber 165 is closed to the atmosphere and may communicate through an outlet 166 and flanges 167, 168 with a conduit 169 which extends to a remote location. The valve body 161 may be surrounded by a plenum or chamber 170 which communicates through a nozzle 171 and flanges 172, 173 with a conduit 174 which extends to a remote location.

The lower portion of the chamber 164 is closed by a lower vacuum plate 175 in which is provided two or more valve ports 176, 177 around which are corresponding valve seats 178, 179. Disposed thereabove in corresponding perforated guide tubes 180, 181 are closure members 182, 183 which for purposes of illustration may be of differing weights. Likewise the lower end of the upper chamber 165 is defined by a plate member 190 in which is provided a plurality of valve ports 191, 192 around which are corresponding valve seats 193, 194. Disposed directly above the ports 191, 192 in corresponding perforated guide tubes 195, 196 are closure members of differing weights, closure member 197 being lighter than closure member 198. In other situations the closure members 197 and 198 may be of equal weight.

Referring first to the left hand side of FIG. 10, the functioning of the valve 160 will be explained for a condition in which the vessel V is under a vacuum or negative pressure. With a vacuum or negative pressure in the flow passage 163 and the chamber 164, the upper closure members 197 and 198 will rest securely against valve seats 193, 194 blocking any fluid communication through ports 191, 192. Initially, the closure members 182 and 183 may also be blocking flow through their respective ports 176 and 177. However, if the vacuum or negative pressure within the vessel V exceeds a per-determined value, the lighter mass closure member 182 may be lifted from its seat 178 allowing air uncontaminated by the surrounding atmosphere to flow from the conduit 174 into the plenum 170 through the port 176 and the flow passage 163 into the vessel V. If this flow is not sufficient to reduce the vacuum or negative pressure or if the vessel is evacuated so quickly that the port 176 cannot handle the flow, the heavier closure member 183 may be lifted from its seat 179 so then the areas of valve ports 176 and 177 then combine to allow a greater flow of air into the vessel V until the vacuum or negative pressure is sufficiently reduced.

Referring now to the right hand side of FIG. 10, the valve 160 will be explained in an operating mode in which the vessel V is under a positive pressure. The positive pressure is communicated through the flow passage 163 to the chamber 164. With positive pressure, the closure members 182 and 183 are forced against their valve seats 178, 179 blocking flow through valve ports 176 and 177. If the pressure within the vessel increases above a predetermined value, the lighter mass closure member 197 is first lifted from its seat 193 allowing the pressure to be relieved through the valve port 191. However, if the area of the valve port 191 is not sufficient to relieve the pressure and the pressure continues to build to a higher preselected value, the heavier closure member 198 will be lifted from its valve seat 194, unblocking valve port 192, so that the areas of ports 191 and 192 then combine to relieve the pressure from the vessel V. The gasses, vapors, etc. exiting through either or both of the ports 191, 192 may pass through a filter element through the nozzle 166 and the conduit 169 for discharge or treatment at a remote point.

Figure 11:
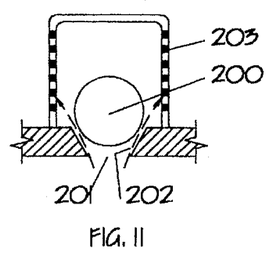
FIGS. 11, 12, 13 and 14 are schematic illustrations of different shapes of valve ports and closure members which may be utilized with the low pressure relief valve of the present invention.

In all of the embodiments of the present invention previously described herein, the closure member is in the shape of a ball or sphere such as the closure member 200 schematically represented in FIG. 11. The closure member 200 blocks a valve port 201 when seated on a surrounding valve seat 202. With a preselected pressure or vacuum, as designed, the ball member 200 will be lifted off the seat 202 to unblock the port 201. The ball 200 will be guided in its upward movement and retained by a tubular guide 203. While a ball or sphere shape is the preferred embodiment several other shapes of closure members may be utilized as illustrated in FIGS. 12–14.

Figure 12:
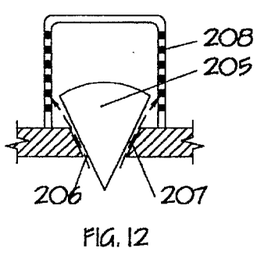

In FIG. 12 a conical shaped closure member 205 is shown closing a valve port 206 around which is a valve seat 207. A guide member 208 retains and guides the conical closure member 205 as it is lifted off of seat 207.

Figure 13:
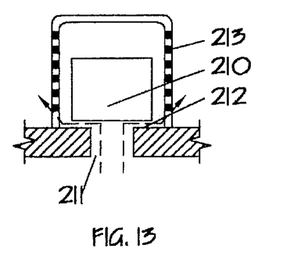

FIG. 13 illustrates a cylindrical or rectangular (regular prism) closure member 210 which closes a port 211 when seated against a surrounding valve seat 212. A tubular or rectangular guide 213 guides the closure member 210 as it is lifted off of the seat 212 to unblock valve port 211.

Figure 14:
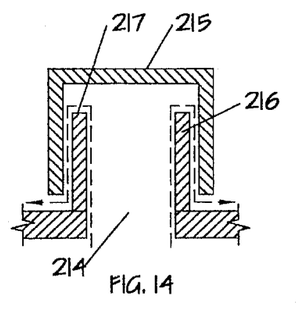

FIG. 14 illustrates an inverted cup or bonnet type closure member 215 utilized to block a valve port 214 upwardly from which extends a tubular guide 216. The upper end of the guide 216 also provides a valve seat 217 which the bonnet 215 may rest against to block fluid communication through port 214. When the pressure or vacuum, as the case may be, is sufficient to lift the bonnet 215, fluid communication will take place through the port 214 and between the walls of the guide member 216 and the bonnet 215.

Figure 15:
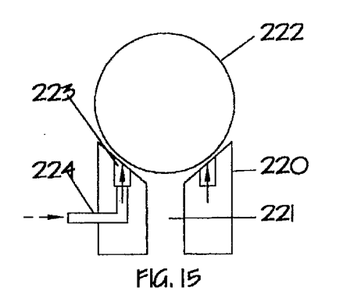
FIG. 15 is an elevation view, partially in section, illustrating a specific valve seat construction which may be utilized with low pressure relief valves of the present invention to assist in disengaging the closure member from the valve seat.

If desired, the relief valve of the present invention may incorporate, as illustrated in FIG. 15, a valve seat 220, surrounding a valve port 221, which is designed to assist in initial breakaway of the rising closure member 222 from the seat 220. This feature is significant in applications where polymerized or other sticky substances may be deposited on the closure member 222 and/or seat 220 which might not allow the closure member 222 to breakaway at the design pressure. The seat 220 has a groove 223 formed in the sealing surface thereof. This groove 223 communicates in at least one point with an injector tube 224 which extends externally of the valve body or housing. Periodically, when adverse conditions are suspected, high pressure, air, gas, solvent or other liquid may be internally injected through the injector tube 224 passing to the groove 223 to apply an instant pressure to breakaway the closure member 222 from the sealing surface of the seat 220. Because the injection medium is applied in very short and rapid bursts, the overall operation of the valve is not affected. This safety seat affords additional insurance that the rising closure member will breakaway at the prescribed pressure when called upon to react, further assuring a fail safe valve.

Figure 16:
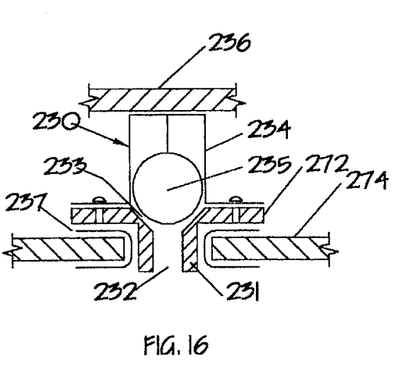
FIGS. 16, 17 and 18 illustrate embodiments of low pressure relief valves of the present invention in which the valves are manufactured as replaceable cartridge assemblies for easy removal and replacement, according to still another alternate embodiment of the invention.
Figure 17:
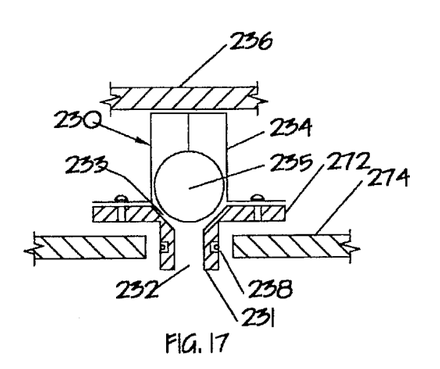
Figure 18:
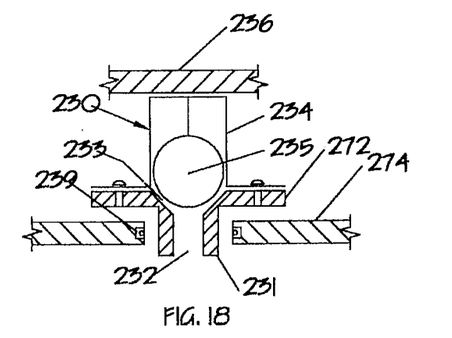

FIGS. 16, 17 and 18 illustrate a closure valve assembly 230 embodying the principles of the present invention in a replaceable cartridge assembly. The cartridge assembly 230 is placed in a port of a pressure plate or vacuum plate such as any of those described with reference to the valves of FIGS. 1–10. In the illustrations of FIGS. 16–18, it will be assumed that the cartridge assembly 230 is being used in valve for a vessel under low positive pressure. The cartridge assembly will include a downwardly projecting tubular base 231 which becomes a valve port 232 and a surrounding valve seat 233. A tubular guide 234 projects upwardly from the valve port 232 to guide a closure member 235. The entire cartridge would be properly positioned in the port or aperture of the pressure or vacuum plate 274 and then firmly held in place by a restraining plate 236. The restraining plate 236 might be an upper pressure plate, a weather hood, plenum wall or any suitable portion of the relief valve with which it is used. Three different sealing arrangements are shown with these cartridge assemblies 230. In FIG. 16 the seal 237 is an annular channel cross-sectioned member which is fitted around the edges of the aperture or port of plate 274. In FIG. 17 the seal 238 is an O-ring seal placed in a groove around the tubular portion 231. In FIG. 18 the seal 239 is an O-ring seal placed in a groove around the aperture or port of plate 274.

The cartridge assembly 230 illustrated in FIGS. 16–18 has several advantages. It is easy to exchange in the case of defective closure components. Each cartridge assembly 230 may be predesigned for specific liftoff pressures and fluid flows. Each cartridge may be color coded or otherwise marked for easy recognition of specific design pressures. The cartridges may be installed in multiples or combinations to facilitate multiple relief pressures and the ability to alter such pressure with minimal effort.

Thus, the low pressure relief valve of the present invention provides a relief valve which is sensitive and accurate and depends only upon a free rising ball closure member for its operation. The lifting of the ball member is affected only by the pressure or vacuum within the vessel with which it is to be used and the force of gravity. No springs, hinges or other components are required for its operation. It is simple in construction and operation.

Several preferred embodiments and variations of the invention are disclosed herein. Many others can be made without departing from the spirit of the invention. Accordingly, it is intended that the scope of the invention be limited only by the claims which follow.

I claim:

1. A low pressure relief valve comprising:

a valve body having a flow passage therethrough providing fluid communication between the interior and exterior of a vessel the interior of which is under a low positive or negative pressure;

first and second valve ports in said valve flow passage having corresponding valve seats therearound;

first and second closure members of preselected weights carried in said valve body and engageable with corresponding ones of said valve seats to block said fluid communication between said interior and said exterior of said vessel, said first closure member being responsive to an increased negative pressure within said vessel to disengage the valve seat of said first valve port, free of any other force than gravity, to permit fluid flow from the exterior of said vessel to the interior thereof to decrease said negative pressure, said second closure member being responsive to an increased positive pressure within said vessel to disengage the valve seat of said second valve port, free of any other force than gravity, to permit fluid flow from the interior of said vessel to the exterior thereof to decrease said positive pressure, said valve therefore maintaining said vessel at pressures between a preselected negative pressure and a preselected positive pressure; and at least one other valve port and one other corresponding closure member carried in said valve body, all of said closure members being exposed to the pressure within said vessel through a common plenum, said other valve port and closure member cooperating with one of said first and second valve ports and closure members to provide additional fluid flow between the interior and exterior of said vessel upon a further increase in pressure, negative or positive, depending upon which of said first and second valve ports and closure members said other valve port and closure member cooperates with, said other closure member being of a weight greater than the weight of the first or second closure member with which it cooperates.

2. A low pressure relief valve comprising:

a valve body having a flow passage therethrough providing fluid communication between the interior and exterior of a vessel the interior of which is under a low positive or negative pressure;

first and second valve ports in said valve flow passage having corresponding valve seats therearound;

first and second closure members of preselected weights carried in said valve body and engageable with corresponding ones of said valve seats to block said fluid communication between said interior and said exterior of said vessel, said first closure member being responsive to an increased negative pressure within said vessel to disengage the valve seat of said first valve port, free of any other force than gravity, to permit fluid flow from the exterior of said vessel to the interior thereof to decrease said negative pressure, said second closure member being responsive to an increased positive pressure within said vessel to disengage the valve seat of said second valve port, free of any other force than gravity, to permit fluid flow from the interior of said vessel to the exterior thereof to decrease said positive pressure, said valve therefore maintaining said vessel at pressures between a preselected negative pressure and a preselected positive pressure; and third and forth valve ports and closure members carried in said valve body, all of said closure members being exposed to the pressure within said vessel through a common plenum, said third closure member being of a weight greater than the weight of said first closure member and being responsive to a further increased negative pressure within said vessel to disengage the valve seat of said third valve port, free of any other force than gravity, to permit additional fluid flow from the exterior of said vessel to the interior thereof to cooperate with said first valve port and closure member to further decrease said negative pressure, said forth closure member being of a weight greater than the weight of said second closure member and being responsive to a further increased positive pressure within said vessel to disengage the valve seat of said fourth valve port, free of any other force than gravity, to permit additional fluid flow from the interior of said vessel to the exterior thereof to cooperate with said second valve port and closure member to further decrease said positive pressure.

3. A low pressure relief valve as set forth in claim 1 including filter means disposed within said valve for filtering fluid flow into or out of said vessel through any of said valve ports for filtering, coalescing or adsorbing selected components thereof.

4. A low pressure relief valve as set forth in claim 2 including filter means disposed within said valve for filtering fluid flow into or out of said vessel through any of said valve ports for filtering, coalescing or adsorbing selected components thereof.

5. A low pressure relief valve as set forth in claim 2 in which an intake side of said first and third valve ports and a discharge side of said second and fourth valve ports are connected to remotely extending conduit means so that fluid communication through said valve ports is not influenced by the environment immediately adjacent said vessel.

6. A low pressure relief valve as set forth in either claim 1 or claim 2 in which at last one of said closure members is spherically shaped.

7. A low pressure relief valve as set forth in either claim 1 or claim 2 in which at least one of said closure members is defined by an inverted cone.

8. A low pressure relief valve as set forth in either claim 1 or claim 2 in which at least one of said closure members is defined by a cylinder.

9. A low pressure relief valve as set forth in either claim 1 or claim 2 in which at least one of said closure members is defined by a regular prism.

10. A low pressure relief valve as set forth in either claim 1 or claim 2 in which at least one of said closure members comprises an inverted cup the bottom of which engages a corresponding valve seat when blocking said fluid communications.

11. A low pressure relief valve as set forth in either claim 1 or claim 2 in which at least one of said valve seats is provided with a recessed groove in fluid communication with a source of pressure which may be periodically applied to a corresponding closure member to momentarily lift said closure member from said seat.

12. A low pressure relief valve as set forth in either claim 1 or claim 2 which at least one of said closure members, ports and valves seat are carried in a cartridge assembly which may be removed from said valve flow passage for repair or replacement thereof.

13. A low pressure relief valve as set forth in claim 12 in which said cartridge assembly may be removed and replaced by a cartridge assembly designed for opening at a different pressure.

14. A low pressure relief valve as set forth in claim 12 including seal means surrounding a portion of said cartridge assembly for sealing with said valve flow passage.

15. A low pressure relief valve as set forth in either claim 1 or claim 2 in which at least one of said closure members, said closure member guide, said port and said valve seat are all carried in a cartridge assembly which may be removed from said valve flow passage for repair or replacement thereof.

* * * * *